Figure 1:
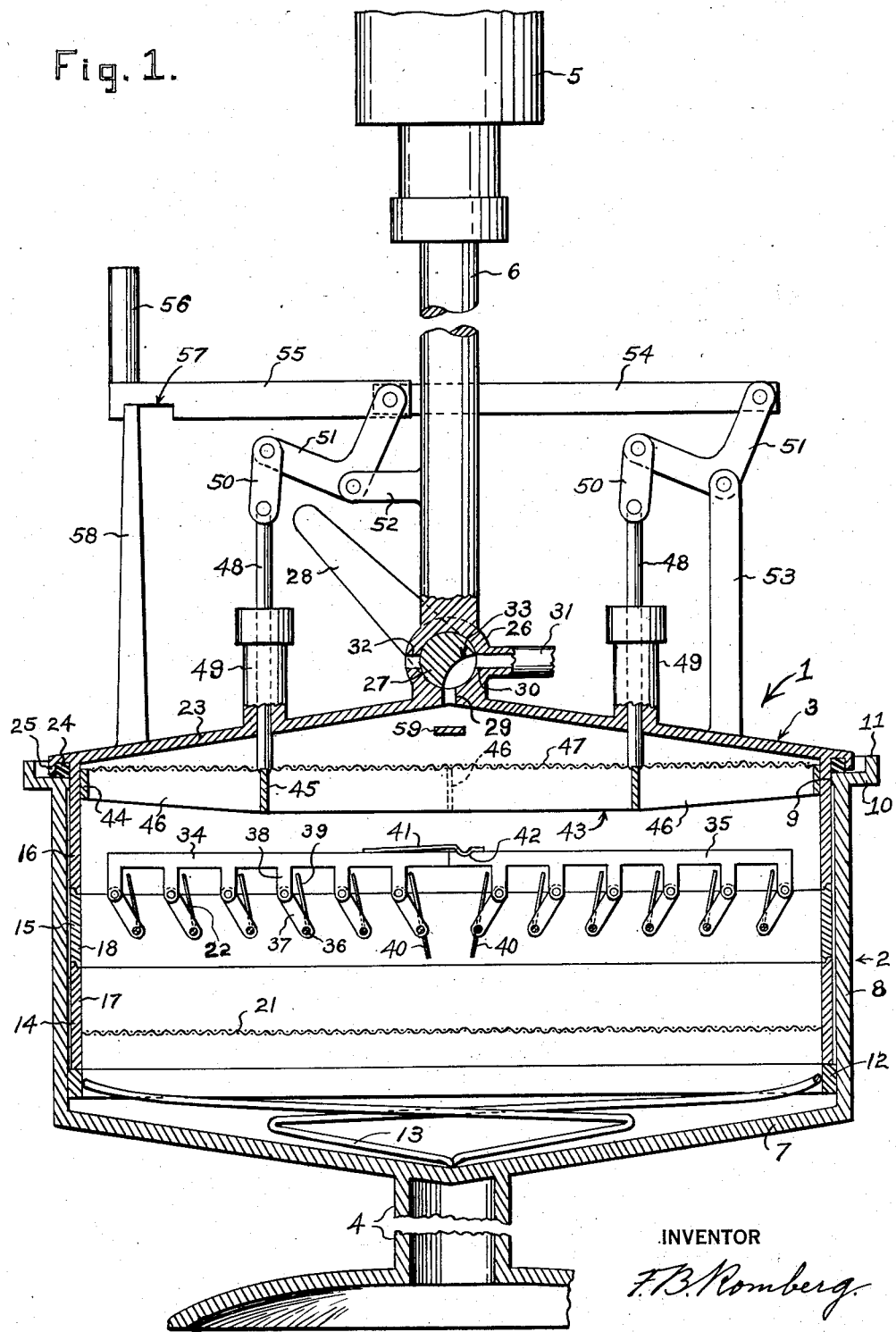

Sept. 24, 1940.  F. B. ROMBERG  2,216,050
PROCESS AND APPARATUS FOR SEPARATING NUT MEATS AND SHELLS
Filed Sept. 24, 1938  2 Sheets-Sheet 1

INVENTOR
F. B. Romberg

Sept. 24, 1940.  F. B. ROMBERG  2,216,050
PROCESS AND APPARATUS FOR SEPARATING NUT MEATS AND SHELLS
Filed Sept. 24, 1938  2 Sheets-Sheet 2

INVENTOR
F. B. Romberg

Patented Sept. 24, 1940

2,216,050

UNITED STATES PATENT OFFICE 2,216,050

PROCESS AND APPARATUS FOR SEPARATING NUT MEATS AND SHELLS

Felix B. Romberg, Holland, Tex.

Application September 24, 1938, Serial No. 231,602

16 Claims. (Cl. 209—3)

This invention relates to improvements in processes and apparatus for separating nut meats and shells from each other.

When a mixture of pecan meats and shells is put into ordinary tap water under ordinary conditions, most of the meats float and most of the shells sink, but some of the shell pieces float and some of the meats sink. This is likewise true for the shells and meats of Persian (English) walnuts, and generally true for other fatty meated nuts and seeds.

The principal constituent of these meats is fat which is a little lighter than water and hence tends to float the meats. The outer portion of the shell of these nuts is a dense stone-like material that proves to be considerably heavier than water. But along the inner side of the wall of the shell, as well as between the lobes of the meats and between the kernel halves, the shells are comprised of tissue that proves to be porous. Shell pieces which float in water are generally comprised partly or wholly of the porous tissue, although some shell pieces which float derive at least a part of their buoyancy from air bubbles entrapped in recesses or adhering to the surface due to the surface tension of water. In the absence of agitation buoyancy may also be in part derived from air trapped between the shell pieces and meats which float.

One object of the invention is to provide a method of treating commingled nut meats and shells of cracked nuts whereby a rapid and cleanly separation of the meats from the shell portions may be effected without physical injury to or appreciably impairing the color, flavor, taste, odor, appearance or other edible qualities of the nut meats.

Another object of this invention is to provide an apparatus for separating nut meats from shells, with liquid, within a brief wetting period so that not much liquid will be absorbed by the meats.

In carrying out this invention I prefer to initially rarefy and partly remove the included air with suction pressure near the vapor pressure of water, and then return the shells to atmospheric pressure while they are in water. The increase in absolute hydrostatic pressure of the water on the shells during the return to atmospheric pressure forces water into porous shell portions and likewise reduces the volume of air bubbles. Similar results may be achieved by increases in absolute hydrostatic pressure partly or wholly above the pressure of the atmosphere.

Agitation of the shells in the liquid at the lower absolute pressure is an improvement in the process as it breaks, unites and liberates bubbles.

It has been found also that by using an appropriate amount of salt in solution in water, the density of the water is increased so that all meats of pecans and Persian walnuts tend to rise in it while all the shells none-the-less tend to sink in it when their included air volume is properly reduced.

Figure 2:
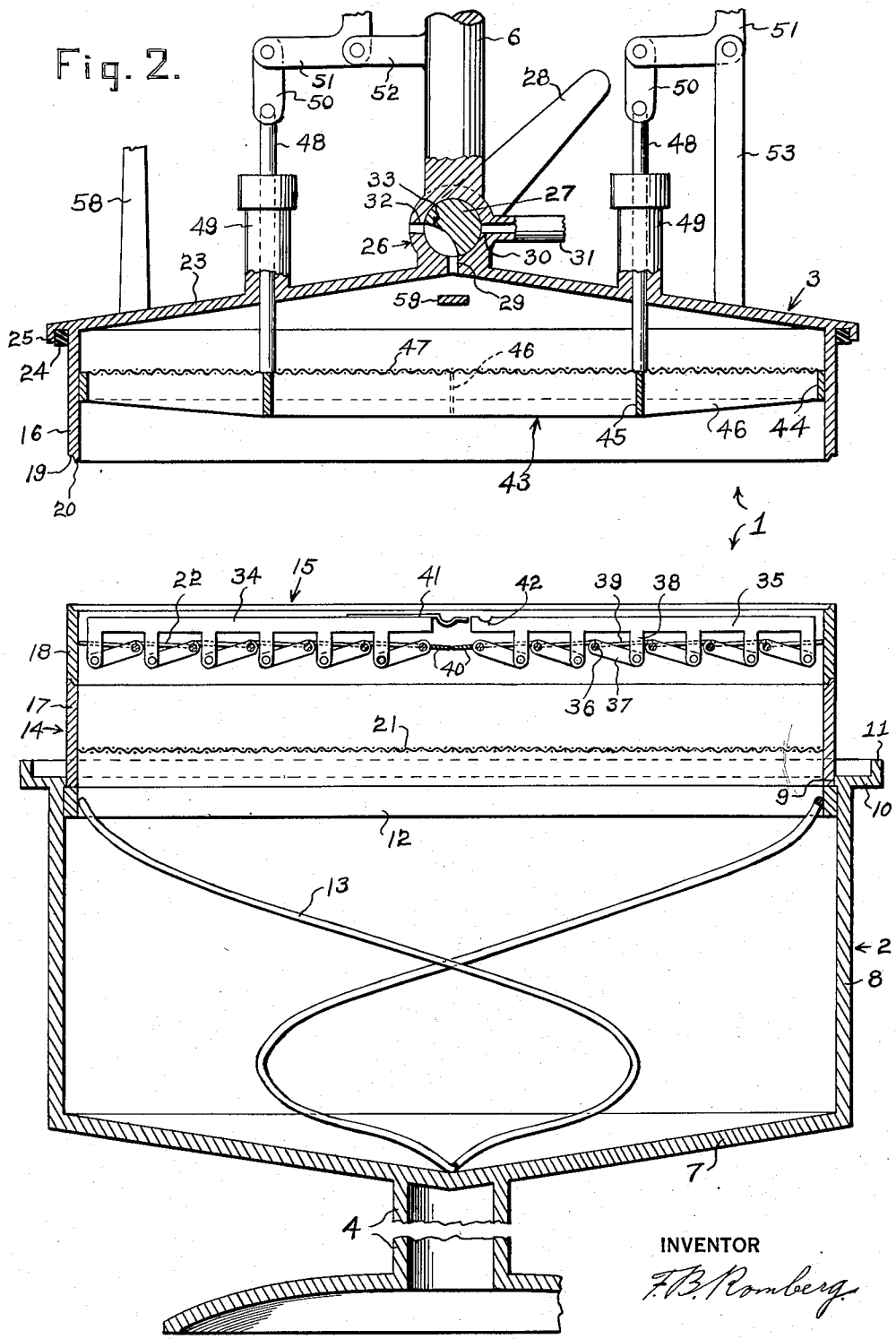

Additional objects of the invention will appear in the following detailed description of a preferred embodiment thereof, reference being had to the accompanying drawings in which:

Figure 1 is a fragmentary section taken along the vertical axis of the preferred apparatus, with the receptacle closed and the shutters open and, Fig. 2 is a view similar to Fig. 1, but showing the receptacle open and the shutters closed.

In the preferred apparatus the receptacle 1 is comprised of a vat 2 and a lid 3 which telescope as shown in Fig. 1.

The receptacle is opened and closed by moving the lid and vat relatively in opposite axial directions. I prefer to do this by securing the vat in a fixed position on the pedestal 4 and raising and lowering the lid with a pneumatic hoist 5, which may be secured in any suitable manner. This hoist actuates a shaft 6 in the axial direction, and the shaft carries with it the lid and keeps it alined with the vat.

The vat may be square in cross section, but I prefer it circular with an upwardly concave bottom 7 and a side wall 8 which is internally cylindrical from the bottom to an internal annular rib 9 opposite which the side wall has a horizontally outwardly offset annular portion 10 from the outer portion of which an annular lip 11 extends upwards.

Within the internally cylindrical portion of the side wall rides a ring 12, the upward movement of which is limited by the rib 9 and which is urged upwardly by any suitable means as, for instance, a spring 13 secured thereto and seated in the bottom of the vat.

Within the side wall 8 and above the ring 12 are received the bottom tray 14, the top tray 15 and, telescopically, the side wall 16 of the lid. The side wall 17 of the bottom tray, the side wall 18 of the top tray and the side wall 16 of the lid have approximately the same outer and inner diameters. The lower edge of the side wall of the lid has an outer step 19 (Fig. 2) and an inner step 20 which lap corresponding steps of the side wall of the top tray when the lid is seated upon that tray. The adjacent side wall edges of the top and bottom trays have similar steps to lap when the top tray is seated upon the bottom tray.

When the lid is moved down from its raised position (Fig. 2) to its closed position (Fig. 1), its side wall 16 seats upon the side wall 18 of the upper tray and pushes the two trays and the ring 12 down ahead of it to the positions shown in Fig. 1. When the lid is raised, the spring 13 keeps the ring 12 and trays 14 and 15 moving up with the lid until ring 12 is stopped by rib 9. The lid opens farther, leaving the trays on ring 12 where they can be removed from the remainder of the apparatus.

The bottom tray 14 has the perforated screen bottom 21 on which the mixture of shells and meats is spread prior to placing the tray on ring 12. The top tray 15 contains perforated shutters 22 which when closed form a screen across that tray (Fig. 2).

Topping the side wall 16 of the lid and integral therewith is a downwardly concave plate 23 which extends outwardly beyond the side wall 16 and there overlaps the rubber ring washer 24 with a pendent annular lip 25 the outer diameter of which is smaller than the inner diameter of vertical lip 11 of the vat. The rubber washer seats on the side wall of the vat when the lid is closed, forming a seal.

At the apex and top side of the lid is situated the valve housing 26, which is integrally joined therewith and contains the valve 27 which has an arm 28 by which it may be rotated.

The valve housing is provided with a port or opening 29 leading to the nether side of plate 23, a port 30 communicating with the suction tube 31, and a port 32 communicating with the atmosphere.

The valve 27 is channeled at 33 to register with and establish communication between ports 29 and 30 when the arm 28 is positioned as shown in Fig. 1 and to register and establish communication between ports 29 and 32 when the arm is positioned as shown in Fig. 2, the ports and valve channel being of proper size and spacing for this purpose and to exclude possibility of communication between ports 30 and 32 when the valve is rotated.

The shutters 22 are in right and left hand series occupying respective halves of tray 15 and connected by tie bars 34 and 35 respectively. Each shutter comprises: a shaft 36 which is journaled at its ends in the side wall 18 of the tray; an arm 37 secured to the shaft midway along its length and pivotally connected with a pendent lug 38 of the respective tie bar; and two perforated blades 39 secured to the shaft in one plane and separated by the arm 37, each blade extending from the arm to the side wall on the same side of the arm. In the case of each of the two centrally located shutters, there is another perforated blade 40 which is secured to the shaft 36 in substantially the same plane as blades 39 but extends from the shaft in the opposite direction. When the tie bars are moved downwardly, blades 40 close the space between the two centrally located shutters by moving inwardly from below, while blades 39 close the remaining spaces by moving outwardly from above. When the shutters are closed, the water can pass through the perforations in the blades while the meats can not.

When the shutters are in open position (Fig. 1), the tie bars 34 and 35 abut and are held together by a spring finger 41 mounted on tie bar 34 and formed to engage tie bar 35 in a socket 42 from which it may readily slide when the tie rods are forcibly urged apart. The shutters are in their open position when the tray 15 is placed into position under the lid 3.

Within the side wall 16 of the lid a perforated screen partition 43 is slidably mounted. This partition comprises the shallow outer ring 44, a deeper concentric ring 45, radial blades 46 connecting rings 44 and 45, and a mesh sheet 47 extending over these rings and blades. Opposite portions of ring 45 are secured to rods 48 48 which pass upward through suitable packing boxes 49 49 on the plate 23 and are connected by links 50 50 to the generally horizontal arms of bellcranks 51 51 which are pivoted respectively on bracket 52 of shaft 6 and an upstanding stud 53 of the plate 23. Generally vertical arms of these bellcranks are pivotally connected with the horizontal bar 54 with which an extension, member 55, is pivotally connected. Member 55 has a grip 56 and notch 57 at what is considered the forward end. An upstanding stud 58 secured to the plate 23 is received in the notch and limits the horizontal motion of member 55 except when the member is raised to disengage the stud.

Horizontal reciprocation of member 55 while the stud 58 is in the notch, reciprocates the screen partition 43 vertically in the lid, with ring 45 not touching the tie bars 34 35 of the shutters. When member 55 is raised to disengage the stud 58 and moved forward an additional amount, the ring 45 is moved downwardly an additional amount engaging the bars 34 and 35 and forcing them downwardly, thereby closing the shutters. During this closing, spring 41 slides out of the socket 42 and drops behind the tie bar 35 as shown in Fig. 2, thus locking the shutters in the near horizontal positon.

Operation

Water, with or without salt in solution, is maintained at such a volume in the receptacle that when the receptacle is in the closed state the screen partition 43 will be under the surface of the water, but that no water will ordinarily be drawn into the suction tube 31. In this connection it should be stated that the water line rises temporarily when suction is applied, owing to the expansion of the air that is included with the shells and meats. The water line falls again when this air has risen to the surface as bubbles.

When the receptacle is in the fully open state the screen bottom of the lower tray 14 is above the water line. Hence fresh contents in this tray are not wetted until the lid, in closing, pushes the tray down. Likewise, when the lid has opened the water drains from the contents of the trays.

For continuous operation of the chamber, it is desirable to have two or more of each of the trays 14 15 so a helper can put the trays in readiness for placement into the receptacle while the receptacle is being operated by another person. This putting in readiness comprises putting a thin layer of the mixture of shells and meats on the screen bottom of a tray 14, placing an empty tray 15 on top of this tray 14 and opening the shutters of the tray 15 so the spring finger 41 engages the tie bar 35 in the socket 42.

After each separating operation the trays in the chamber are removed and a new set of trays, previously put in readiness, is inserted in their place above ring 12. At this time the valve arm 28 is in the angular position shown in Fig. 2 and the valve channel 33 registers with ports 29 and 32.

The lid 3 is now lowered through the operation of hoist 5 and pushes the trays down into the water until the receptacle is closed. Some water is isolated in the space between annular lips 11 and 25 and improves the seal at the rubber washer.

The valve arm 28 is then shifted to the angular position shown in Fig. 1, thereby closing port 32 and opening communication between the interior of the receptacle and the suction tube 31 in which pressure is maintained at near the vapor pressure of the water by any known means, preferably including a large vacuum tank (not shown).

As communication is opened between the interior of the receptacle and the suction tube, the fluid pressure in the receptacle falls and the air included with the shells expands accordingly. Air literally boils from spongy parts of shells; and the air bubbles attached to shells and meats become greatly enlarged and generate loose bubbles. Buoyed by enlarged air bubbles, both shells and meats tend to rise but are checked by the screen partition 43. Member 55 is reciprocated manually at this time within the limits of notch 57, and the screen partition is thereby rapidly oscillated up and down, agitating the shell and kernel pieces and causing air bubbles to break from them and to pass through the screen.

After a suitable period, the valve arm is shifted to reestablish atmospheric pressure in the receptacle. Air rushing downwardly through port 29 is deflected sidewise by a plate 59 below the port to avoid blowing new air bubbles into the water. As the air pressure rises in the receptacle it increases the hydrostatic pressure of the water on the shells and forces water into porous shell portions and reduces to negligible size the volume of air bubbles attached to or pent up in shell pieces. All shell pieces are now heavier than the water and sink.

After allowing the shells time to sink past the shutters, the shutters 22 are closed by moving member 55 upward and forward out of engagement with stud 58.

This is followed by raising the lid through the operation of hoist 5, and as the lid moves up the spring 13 presses the ring 12 and trays along with it until the ring is stopped by the rib 9. The meats now lie deposited on the closed perforated shutters of the top tray 15, and the shells lie deposited on the screen bottom of the lower tray 14.

The trays are removed and a new cycle is started by replacing them with new trays previously put in readiness, the receptacle water being used repeatedly. Receptacle water removed by the wetted shells and meats may be replaced by continuously discharging a small stream of new water inside the upstanding lip 11 from any suitable means (none shown).

Meats and shells are not wetted long by the receptacle water. This is advantageous in two ways: less receptacle water is absorbed by the meats and less tannin leaches into the receptacle water from the shells. These two factors are especially desirable if there is salt in solution in the water to raise its specific gravity. For economic reasons salt water is not changed as frequently as pure water. Meats recovered from salt water are rinsed and bathed in pure water for a short time immediately upon their removal from the receptacle, to remove salt and tannin.

One way to use salt water is to use two receptacles in sequence, one with pure water and the other with salt water; then first recovering all the meats which rise in pure water, and thereafter recovering the remaining meats in salt water by placing each tray of shells from the pure water receptacle in the salt water receptacle.

It is a principle of physics that the volume of a mass of air varies inversely as its absolute pressure, at a given temperature. Thus when the absolute hydrostatic pressure at an air bubble on a piece of shell in the receptacle water is decreased from 14.6 pounds per square inch (approximately the atmospheric pressure) to 1.46 pounds per square inch, the volume of the air bubble is increased tenfold; and when the absolute hydrostatic pressure at the air bubble is reduced to .73 pound, its volume is increased twentyfold. Under agitation in my apparatus approximately all this increase in volume is broken off and rises to the surface of the water, the air bubble remaining its original size but rarefied so as to represent only one-tenth or one-twentieth of the original mass. Hence when the pressure of the air above the water in the receptacle is returned to that of the atmosphere, the hydrostatic pressure of the water in the receptacle is increased similarly and this rarefied air bubble will become one-tenth or one-twentieth of its original volume and its buoyancy will thus be reduced 90% or 95% as compared to the original.

Some of the air in shell tissue is in open pores and ducts and, like an air bubble, changes volume freely with the changes in absolute hydrostatic pressure of the receptacle water. Other air is inside closed cells. A reduction in absolute hydrostatic pressure from 14.6 pounds to 1.46 pound in receptacle water means that the pressure of the air inside of a hollow cell exceeds the receptacle water pressure by more than 13 pounds per square inch, unless the cell wall breaks or distorts under the strain. It seems that the cells in pithy portions of pecan shells rupture readily, for the air in them appears to emerge as free air when the suction pressure is applied. On the other hand, the suction pressure does not appear to damage the meats.

As previously stated, the use of increases in hydrostatic pressure partially or wholly above that of the atmosphere is optional. Thus a 90% reduction in included air volume can be secured by raising the hydrostatic pressure of water upon shells and meats therein from 14.6 pounds absolute to 146 pounds absolute, or from atmospheric pressure to 131.4 pounds above atmospheric. Since this last case represents approximately ten times greater absolute increase in pressure for the same relative increase in absolute pressure, more cell walls are broken.

It is to be understood that the process and apparatus which I have described is to be taken as a preferred example of my invention, and that they in no way limit the variety of expressions which may be given to the principles of the invention without departing from its spirit or from the scope of the subjoined claims.

I claim:

1. In an apparatus for separating nut meats from shells, in combination, a chamber for containing a liquid separating medium and meats and shells of cracked nuts in said medium, means for subjecting said medium to a decided change in absolute fluid pressure in said chamber, means for imparting an up and down beating action on the meats and shells in the liquid medium, and means mounted and arranged to close across said chamber and partition the meat containing portion of said medium from the shell containing portion thereof.

2. In an apparatus for separating nut meats from shells, of cracked nuts, in combination, a chamber for containing a liquid searating medium and meats and shells of cracked nuts in said medium, means for subjecting said medium to a decided change in absolute fluid pressure in said chamber, a group of shutters pivotally mounted in said chamber to form a partition there across when closed, and means for confining pieces of the meats and shells in the liquid below the surface thereof and subjecting the same to an up and down agitating motion.

3. In an apparatus for separating nut meats from shells of cracked nuts, in combination, a receptacle constructed to receive a liquid separating medium and meats and shells of cracked nuts in said medium, means for changing the fluid pressure of said medium, a perforated partition in said receptacle having perforations of a size such that ordinary nut meats and shells will not pass therethrough, and means for oscillating said partition in said receptacle and thereby agitating meats and shells in said medium.

4. In an apparatus for separating nut meats from shells, in combination, a receptacle comprising a vat having an opening at the top and a lid constructed to close said opening, said receptacle being constructed to receive a liquid separating medium and meats and shells in said medium, means for subjecting said separating medium to a marked change in absolute fluid pressure in said receptacle, a perforated partition carried by said lid, and means operative from the exterior of the receptacle to oscillate said partition upwardly and downwardly in said receptacle to agitate meats and shells in said medium.

5. In an apparatus for separating nut meats from shells of cracked nuts, a receptacle having a chamber for a liquid bath and meats and shells of cracked nuts in said bath, means for confining the meats and shells within a limited portion of said bath and comprising a perforated partition disposed near the surface of said bath, the perforations of said partition being of such size that ordinary nut meats and shells will not pass therethrough, means to reciprocate said partition upwardly and downwardly to agitate said meats and shells and screen air therefrom, and means to subject the liquid of said chamber to sub-atmospheric pressure.

6. The process of separating detached fatty nut meats from shells of cracked nuts mixed therewith, including shell pieces which contain porous tissue and will not sink before treatment, in a chosen aqueous separating liquid in which the meats will float, which consists in immersing the mixture of the meats and shells of the cracked nuts in an aqueous liquid, subjecting the mixture of meats and shells to an increase in hydrostatic pressure by the liquid to a degree where the liquid is forced into said porous tissue and said shell pieces become of greater density than the meats, and allowing the meats and shells to separate in an aqueous liquid having a density intermediate that of the treated meats and shells.

7. The process of separating detached fatty nut meats from shells of cracked nuts mixed therewith, including shell pieces which contain porous tissue and will not sink before treatment, in a chosen aqueous separating liquid in which the meats will float, which consists in treating the mixture of the meats and shells of the cracked nuts in an aqueous liquid at a temperature below its atmospheric boiling point by subjecting the mixture of meats and shells to an increase in hydrostatic pressure by the liquid to a degree where the liquid is forced into said porous tissue and said shell pieces become of greater density than the meats, and allowing the meats and shells to separate in an aqueous liquid having a density intermediate that of the treated meats and shells.

8. The process of separating detached fatty nut meats from shells of cracked nuts mixed therewith, including shell pieces which contain porous tissue and will not sink before treatment, in a chosen aqueous separating liquid in which the meats will float, which consists in immersing the mixture of the meats and shells of the cracked nuts in an aqueous liquid, subjecting the meats and shells to agitation to liberate air bubbles therefrom, subjecting the mixture of meats and shells to an increase in hydrostatic pressure by the liquid to a degree where the liquid is forced into said porous tissue and said shell pieces become of greater density than the meats, and allowing the meats and shells to separate in an aqueous liquid having a density intermediate that of the treated meats and shells.

9. The process of separating detached fatty nut meats from shells of cracked nuts mixed therewith, including shell pieces which contain porous tissue and will not sink before treatment, in a chosen aqueous separating liquid in which the meats will float, which consists in subjecting the mixture of meats and shells of cracked nuts to sub-atmospheric pressure to withdraw air therefrom, treating the mixture in an aqueous liquid by increasing the absolute hydrostatic pressure of the liquid upon the meats and shells from sub-atmospheric pressure to a degree where the liquid is forced into said porous tissue and said shell pieces become of greater density than the meats, and allowing the meats and shells to separate in an aqueous liquid having a density intermediate that of the treated meats and shells.

10. The process of separating detached fatty nut meats from shells of cracked nuts mixed therewith, including shell pieces which contain porous tissue and will not sink before treatment, in a chosen aqueous separating liquid in which the meats will float, which consists in immersing the mixture of the meats and shells of the cracked nuts in an aqueous liquid, subjecting the mixture of meats and shells to sub-atmospheric hydrostatic pressure in the liquid, agitating the meats and shells to release air from the shells, increasing the hydrostatic pressure of the liquid upon the meats and shells to a degree where the liquid is forced into said porous tissue and said shell pieces become of greater density than the meats, and allowing the meats and shells to separate in an aqueous liquid having a density intermediate that of the treated meats and shells.

11. The process of separating detached fatty nut meats from shells of cracked nuts mixed therewith, including shell pieces which contain porous tissue and will not sink before treatment, in a chosen aqueous separating liquid in which the meats will float, which consists in immersing the mixture of the meats and shells of the cracked nuts in a bath of liquid in which some of the shell pieces are buoyant, imposing a restraining influence upon the meats and buoyant shell pieces adjacent to but below the surface of the bath to keep them immersed and from rising to the top of the bath, subjecting the mixture of meats and shells to an increase in hydrostatic pressure by said liquid of the bath to a degree where the liquid is forced into said porous tissue and said shell pieces become of greater density than the meats, and allowing the meats and shells to separate in an aqueous liquid having a density intermediate that of the treated meats and shells.

12. The process of separating detached fatty nut meats from shells of cracked nuts mixed therewith, including shell pieces which contain porous tissue and will not sink before treatment, in a chosen aqueous separating liquid in which the meats will float, which consists in immersing the meats and shells of the cracked nuts in a bath of liquid in which some of the shell pieces are buoyant, imposing a restraining influence upon the meats and buoyant shell pieces adjacent to but below the surface of the bath to prevent them from rising to the top of the bath and keep them immersed and simultaneously screening air from the meats and shells, subjecting the mixture of meats and shells to an increase in hydrostatic pressure by the liquid to a degree where the liquid is forced into said porous tissue and said shell pieces become of greater density than the meats, and allowing the meats and shells to separate in an aqueous liquid having a density intermediate that of the treated meats and shells.

13. The process of separating detached fatty nut meats from shells of cracked nuts mixed therewith, including shell pieces which contain porous tissue and will not sink before treatment, in a chosen aqueous separating liquid in which the meats will float, which consists in immersing the mixture of the meats and shells of the cracked nuts in a bath of liquid, subjecting the liquid of said bath to sub-atmospheric pressure, imposing a restraining influence upon the meats and buoyant shell pieces adjacent to but below the surface of the bath to prevent them from rising to the top of the bath and keep them immersed and simultaneously screening air from them, increasing the hydrostatic pressure of the liquid upon the meats and shells to a degree where the liquid is forced into said porous tissue and said shell pieces become of greater density than the meats, and allowing the meats and shells to separate in an aqueous liquid having a density intermediate that of the treated meats and shells.

14. In an apparatus for separating detached nut meats from shells of cracked nuts, a receptacle for containing soaking liquid and meats and shells of cracked nuts in said liquid, means to subject the liquid in the receptacle to less than atmospheric pressure and to maintain said pressure for a period, perforated means for removing bubbles of air liberated from said shells in said liquid during said period, and means for causing, in said liquid, back and forth mutually penetrating relative movement between said perforated means and at least a portion of said liquid during such period, said perforations being of a size and multiplicity allowing ready passage of liquid and air through said perforated means during said penetrating movement but restraining passage therethrough of meats and shells to be separated.

15. In an apparatus for separating detached nut meats from shells of cracked nuts, a receptacle for containing a liquid soaking medium and meats and shells of cracked nuts in said medium, means for subjecting said medium and meats and shells therein to sub-atmospheric pressure in said receptacle, a partition extending across the body portion of said receptacle and having perforations therein allowing ready passage of liquid and air through said partition but restraining the passage of meats and shells therethrough, and means for causing, in said medium, mutually penetrating relative movement between the partition and at least a portion of said medium while said medium is at sub-atmospheric pressure.

16. In an apparatus for separating detached nut meats from shells of cracked nuts, a receptacle for containing a soaking liquid and meats and shells of cracked nuts in said liquid, means to subject the liquid in the receptacle to sub-atmospheric pressure, means, including perforated means, to allow escape of air liberated from said meats and shells while holding the meats and shells immersed within the liquid in said receptacle, and means to cause mutually penetrating relative movement between said perforated means and at least a portion of said liquid while the pressure of said liquid is sub-atmospheric, the perforations of said perforated means being of a size and multiplicity allowing ready passage of water and air therethrough during said relative movement but restraining passage therethrough of meats and shells to be separated.

FELIX B. ROMBERG.